Sept. 22, 1942.  C. L. RUHL  2,296,576
COMPOSITE SOAP DISH
Filed Nov. 20, 1939
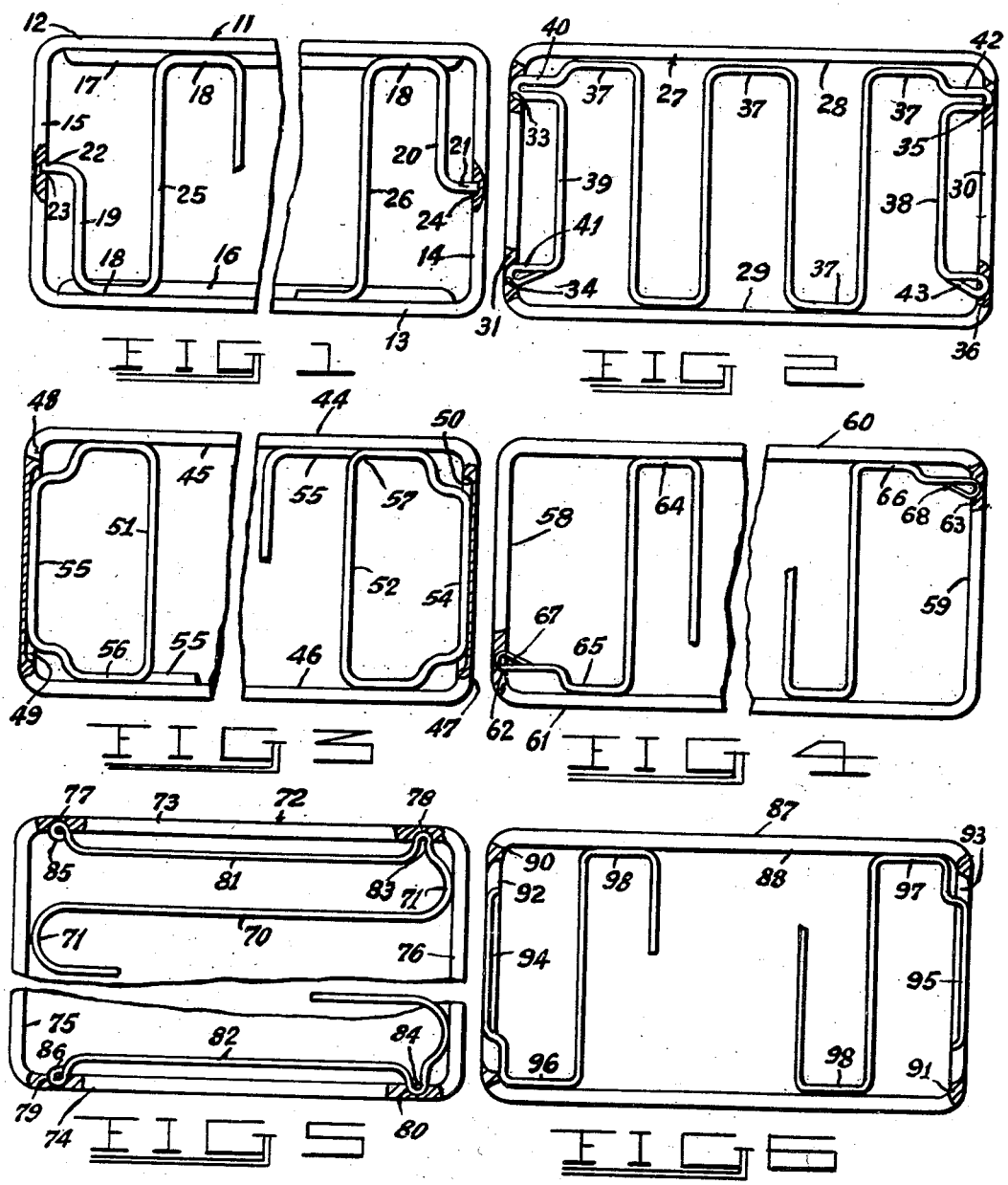

Patented Sept. 22, 1942

2,296,576

UNITED STATES PATENT OFFICE 2,296,576

COMPOSITE SOAP DISH

Charles L. Ruhl, Dallas, Tex.

Application November 20, 1939, Serial No. 305,260

1 Claim. (Cl. 45—28.1)

This invention relates to a combined soap-drip-receiving tray, and a soap suspension rack adapted to be removably placed in the tray, and also be frictionally held in place, at will, by impingement with tray-retainers through the resilience inherent in the rack.

The object of the invention is to provide a rack, so bent upon itself, out of a single portion of stock, and in laterally disposed directions to either side of the elongated axis thereof, that when pressure is manually directed through the elongated axis of the rack by pressing with the balls of the fingers upon the two outer bars of the rack, that the impingement may be released, and the frictional engagement between the rack and the tray broken, and the rack easily removed.

In carrying out this object, primarily of most importance, I have found that the concept may be expressed in a variety of mechanical forms, some of which are shown on the sheet of drawings, accompanying and forming a part of this specification.

Likewise, there is also shown a variety of rack-retention recesses and ledges, co-operating to hold the rack in proper suspension to forbid the soap-cake from coming into contact with the drippings in the tray.

Other objects of the invention will have their appearance on further reading the following specification.

Referring to the drawing,

Figure 1 is a top plan view of a tray and a rack, the bent loops of the latter being diametrically opposed to each other, and are in alignment with the elongated axis of the rack, and impinging the walls of the rack-retention recesses in the tray.

Figure 2 is a top plan view of a rack and tray, the rack having outwardly bent loops extending in opposite directions at each side of the axial line through the rack, and in parallelism, and which impinge retainers in the tray.

Figure 3 is a top plan view of the rack and the tray with the outer bars of the rack offset from the rack, to engage elongated slots in the end walls of the tray, and for impinging the walls of said elongated slots.

Figure 4 is a top plan view of a tray and a rack, and wherein the rack is bent upon itself and terminates in diametrically opposed loops which are offset from each other and from the longitudinal axis of the rack, and which enter into insert-retainers in the end-walls of the tray.

Figure 5 is a top plan view of a tray and a rack, the latter being formed into loops in parallelism with the elongated axis of the rack, and including lateral offset formations to enter retainers in the wall and impinge them to frictionally hold the rack in the tray through the inherent resilience in the rack.

Figure 6 is a top plan view of a rack and a tray, said rack being formed into bights, and bifurcations, and terminating in offset end bars which are adapted to impinge elongated slots in the end walls of the tray.

In these several views, similar characters of reference will indicate like parts.

In the view, shown in Figure 1, the tray is indicated by 11, having rectangular shape, and two longer side walls 12 and 13, and two shorter end walls 14 and 15. The side walls on the inner side of the tray are formed into ledges 16 and 17.

A rack, formed of a single strand of wire, is bent upon itself forming plural opposed loops which rest upon the side wall edges 16 and 17. The end-bars 19 and 20 terminate laterally in tines 21 and 22, and in their lateral extension, while in alignment with each other, are purposely just a little out of alignment with the axis of the openings 23 and 24 in the side walls 14 and 15 of the tray 11. By a pressure from the fingers, directed in opposed directions against the bar 25 and 26, the tines 21 and 22 may be readily withdrawn from the openings 23 and 24, and the rack removed for cleaning both rack and tray. In Figure 2, the tray 27 consists of side walls 28 and 29, and end walls 30 and 31, the latter being provided with recesses 33, 34, 35, and 36, these being near each end of each side wall, but in alignment with each other.

A rack formed of a strand of wire is bent upon itself to create loops and turns 37 and end-bars 38 and 39, and at the intersection of the turns and end bars, the rack is formed into loops 40, 41, 42 and 43, designed to enter the end-wall recesses aforementioned, and not only hold the rack in balanced position within in tray, but the inherent resilience of the rack formation will cause the loops 40, 41, 42 and 43 to impinge the walls of the recesses 33, 34, 35 and 36.

The view shown in Figure 3 provides for a tray 44 having side walls 45 and 46, and end walls 47 and 48, the latter being provided with elongated slots 49 and 50.

For balanced disposition within this tray is a rack, bent out of a strand of wire, and formed into two end loops 51 and 52, the outer bars 53 and 54 whereof are offset outwardly and are designed to enter into slots 49 and 50 and impinge the walls thereof through the inherent resilience in the rack which, in addition to said end-loops 51 and 52 is formed into reversed loops with the bights 55 thereof running parallel and in proximity with the side walls 45 and 46 of the tray.

Some of the bights 55, in the construction may be spot-welded to the loops 51 and 52 at 56 and 57, and, if desired, the connections between the loops 51 and 52 may be otherwise attached and arranged.

Figure 4 consists of a tray 57 consisting of end walls 58 and 59 and side walls 60 and 61. Each end wall at one corner is provided with a recess 62 and 63, and in diagonal relation to each other. The rack is a formation from a single stand of wire, comprising loops formed alternately in reverse order so that their bight 64 will run parallel with the side walls 60 and 61, and from this formation extends laterally disposed bars 65 and 66, which terminate in loops 67 and 68 which, through the inherent pressure from rack resilience, will impinge the walls of the recesses 62 and 63, thus holding the rack in place in the tray.

Referring to Figure 5, the order is somewhat reversed, as to the rack formation, which consists of a rack bent upon itself, to form elongated rest bars 70 terminating in loops 71 and which run parallel with the elongated axis of the tray 72 consisting of side walls 73 and 74 and end walls 75 and 76. Each side wall, near its end or corner is provided with recesses 77, 78, 79 and 80, and the outer bars 81 and 82 of the rack, and running along the side walls 73 and 74 are offset at 83 and 84 near each turn 71, and formed into loops 85 and 86, and these are designed by pressure to impinge the walls of the recesses 77, 78, 79 and 80 formed in said side walls.

By reference to Figure 6, the tray consists of side walls 88 and 89, and end walls 90 and 91, the latter being provided with elongated slots 92 and 93, and these slots are adapted to receive offset tines 94 and 95, proceeding from bars 96 and 97, which are a part of a bent upon itself rack consisting of loops and turns 98 which run parallel with the side walls of the tray.

Having thus set forth the invention, I claim:

A composite soap dish comprising a rectangular tray with upstanding walls, the end walls whereof are provided with sockets, a flexible rack consisting of opposed U shaped formations, and the outer bars of the loops being formed into two separated sets of lateral turns to enter into said sockets.

CHARLES L. RUHL.